Feb. 26, 1952  J. B. KOHLER ET AL  2,586,833
CORE ENVELOPER

Filed May 21, 1945  6 Sheets-Sheet 1

Fig.1

Inventors
John B. Kohler
Maurice J. Anderson
by Parker & Carter
Attorneys.

Feb. 26, 1952   J. B. KOHLER ET AL   2,586,833
CORE ENVELOPER
Filed May 21, 1945   6 Sheets-Sheet 3

Feb. 26, 1952  J. B. KOHLER ET AL  2,586,833
CORE ENVELOPER
Filed May 21, 1945  6 Sheets-Sheet 5

Inventors.
John B. Kohler
Maurice J. Anderson
by Parker & Carter
Attorneys.

Patented Feb. 26, 1952

2,586,833

UNITED STATES PATENT OFFICE 2,586,833

CORE ENVELOPER

John B. Kohler and Maurice J. Anderson, Chicago, Ill., assignors to The Kohler System Company, Chicago, Ill., a corporation of Illinois Application May 21, 1945, Serial No. 594,998

20 Claims. (Cl. 242—56)

This invention relates to a winding roll changer. It is particularly applicable for use in connection with apparatus for winding paper or other web materials and it has for one object to provide means and methods for continuous operation by means of which a continuously moving web may be transferred from a completed roll to a new roll so that successive rolls of web may be formed without interrupting the winding operation and so that the web may be transferred while in motion from a completed roll to a new roll.

In general in the means and methods shown the roll is formed on a core, shaft, arbor or mandrel and when a roll has been completed a new core or shaft is positioned for use and the web is severed and the severed end is transferred to a new core. The completed roll is removed and the new roll is formed as the web continues its uninterrupted movement.

The device includes, therefore, roll supporting means or core supporting means and it includes means for severing the web and for directing the severed end to and about a new core or a new roll position. Associated with the web severing means is a controlling or guiding means which may engage the severed end of the web for directing it about a new core or shaft.

Another object of the invention is therefore to provide such controlling means accomplishing the results indicated.

Other objects will appear from time to time in the course of the specification and claims.

The invention is illustrated more or less diagrammatically in the accompanying drawings wherein:

Figure 4A illustrates the web, just after it has been severed and as it is being controlled to form a bight for engagement about a new core;

Like parts are indicated by like symbols throughout the specification and drawings.

Figure 1:
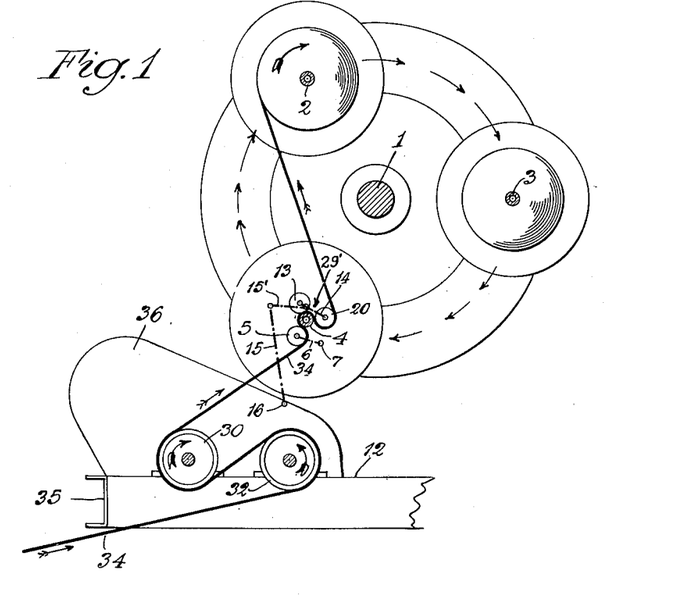
Figure 1 is a diagrammatic side elevation of one form of the device illustrating the positioning of the web about a new core.

As shown in Figure 1 three roll forming and supporting means are indicated diagrammatically as being carried upon a shaft 1. Means are provided for supporting three cores 2, 3, and 4. These cores will be carried upon shafts or other supporting means which may be arranged to be driven selectively, or otherwise. The details of the cores and the driving means are not shown, as the invention does not relate particularly to them but rather to the means for positioning a core in place, for securing the severed end of the web about the core and for completing the roll.

As shown in Figure 1 the core 4 is in position for the starting of a new roll. The web guiding and positioning means of Figure 1 are illustrated in greater detail and on an enlarged scale in Figure 2. As there shown they include three rollers. The roller 5 is carried on the arm 6 having a stop 6' and being pivoted as at 7 on a suitable support 8. A spring 9 is secured at one end as at 10 to the arm 6 and at the other as at 11 to a base 12.

Figures 2, 4:
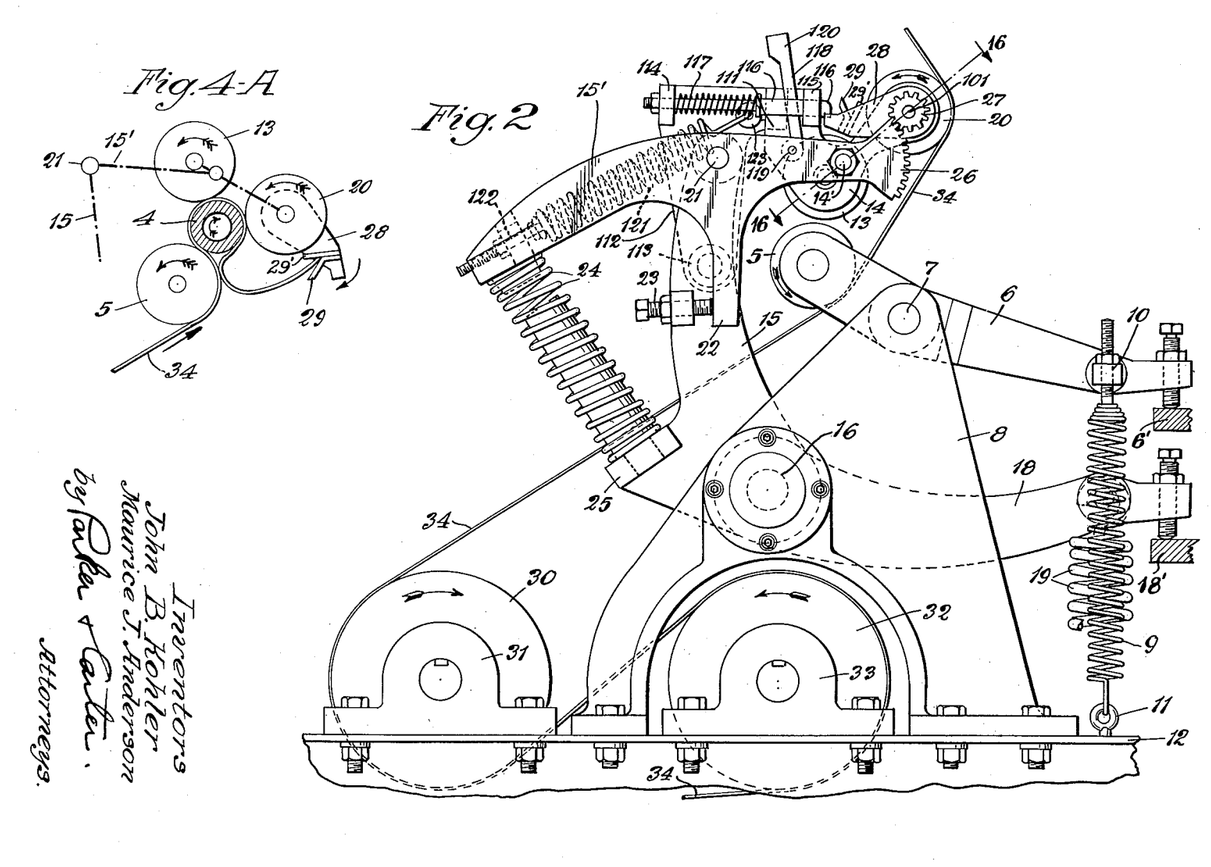
Figure 2 is a detailed showing of the guide roller construction of Figure 1.
Figure 4 illustrates a further step in the movement of the parts shown in Figure 1 just before the severing of the web from a completed roll.
Figure 3:
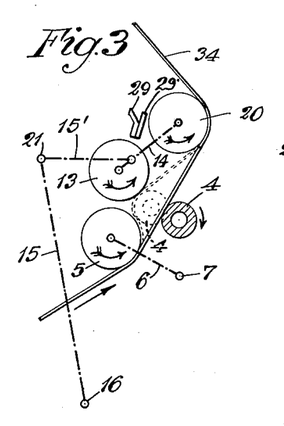
Figure 3 is a diagrammatic showing of the movement of the new core into the path of and into contact with the web.
Figure 4:
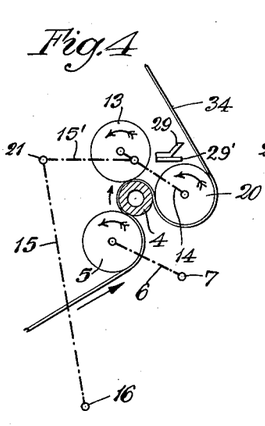
Figure 5:
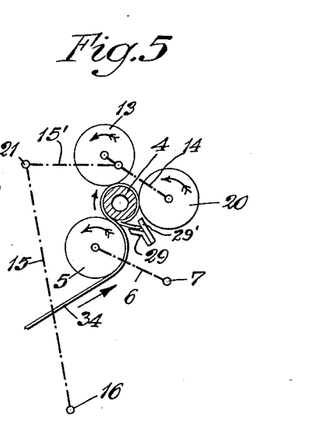
Figure 5 illustrates the web at a later stage, after it has been severed and as it is being directed onto the new core.

A second roller 13 is supported on the arm 14 which is pivoted at 14' on the lever 15' which latter is pivoted as at 21 upon the arm 15. The arm 15 is provided with an extension 18 the end of which is secured to one end of the spring 19, being held yieldably against the stop 18' by said spring 19. The other end of the spring 19 is secured to the base 12 or elsewhere. The arm 15 is pivoted as at 16 upon any suitable base or support.

A third roller 20 is carried on the arm 14. The relative movement of the member 15 and 15' is limited in one direction by the stop portion 22 on the member 15' and the adjustable stop 23 mounted on the portion 15. A compression spring 24 bears at one end upon the abutment 25 fixed upon the portion 15 and at the other end bears against the portion 15' and tends yieldingly to hold the parts shown in position in Figure 2. The member 15' is provided preferably in one end with a segmental gear 26 which meshes with a pinion 27. A pair of knife carriers 28, pivoted on a shaft 101, which in turn is carried by the arms 14, is provided between which is mounted a knife 29. The preferred form of the knife includes two members, a bent member 29 with a sharpened edge, and a straight member 29', the two being fixed together to form a combined severing and web engaging means. The action of the knife will be described below. As will be seen lparticularly in Figs. 4–A and 5 the knife 29 is shaped not merely to receive the web but is also shaped to engage the severed end of the web and direct it into suitable position about the new core and in contact with the inrunning web so that the inrunning web engages the severed end of the web and secures it properly about the new core. It will be noted that as the member 29 enters the running web the severed end is turned up and into the V between the members 29 and 29', the entire free severed end being trapped therein by the final cutting action. Thus, the free web end is engaged and arrested by the severing means, and since the outrunning nip between the pressure member and the arbor continues to feed web during the stroke of the knife, a bight is formed, and the shape and position of this bight is controlled by the severing means which is moving in the direction of the inrunning point of contact between the web and the arbor. One particular form of knife operating means is shown in detail in Figures 2, 15, 16, and 17. The operation of that particular means is later described.

The complete structural details of the form of the device illustrated in the form of Figures 1 to 8 inclusive are not shown as they form no essential part of this invention as the invention is not limited to them. The invention may embody different sorts of reel constructions. Means for driving the web are provided and these may include roller 30 carried in a bearing 31 and a roller 32 carried in bearings 33. The web 34 passes about the rollers 30 and 32 and is engaged by the rollers 5, 13 and 20. The entire structure is carried on suitable supports from a base or foundation 35 and the web driving means may be enclosed within a housing 36. As shown in Figures 1 to 8 inclusive the core 4 moves from the new stages shown in Figures 1 and 3 to the advanced or final stage where the roll is completed as shown in the position of the core 2 in Figure 1.

Figure 12:
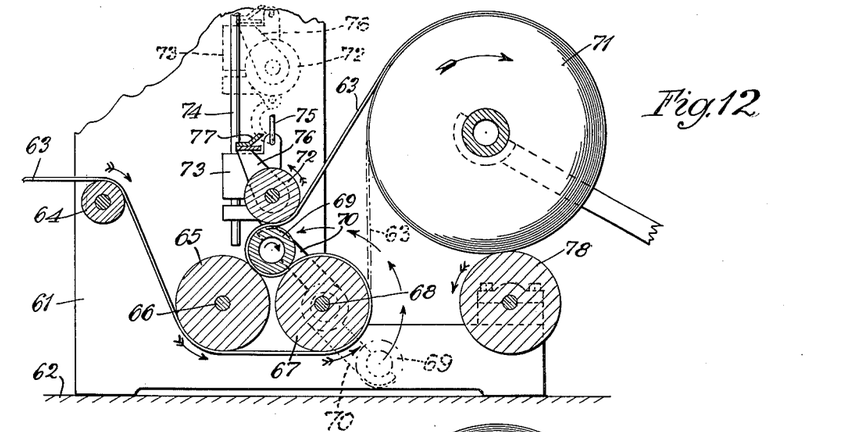
Figure 12 illustrates a further modification of the device and shows the parts in the position which they occupy on the substantial completion of one roll. It shows a new core in position in contact with the moving web.
Figure 13:
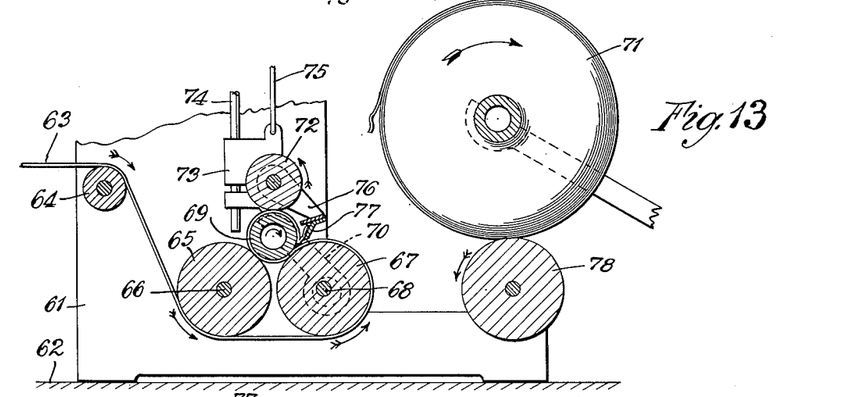
Figure 13 illustrates the parts of Figure 12 after the moving web has been severed upon the completion of a roll and with the cutting and controlling means in the position to which they have moved in tucking the severed end about a new core.
Figure 14:
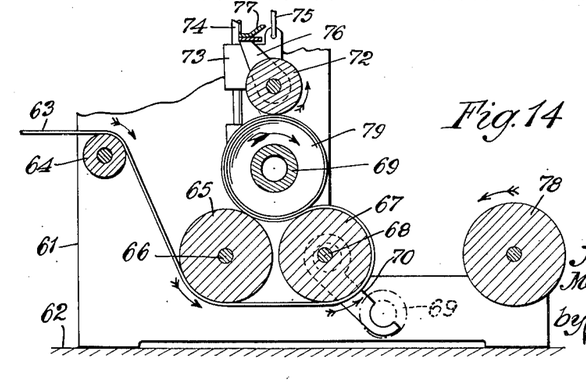
Figure 14 shows the new roll partially completed with the severing means out of operative position.

In the modified form of Figures 12, 13 and 14 the device is illustrated as applied to permit continuous operation of a so called "two drum winder." Such winders are well known at present and are in general use in the paper and textile fields. The novelty in this form of the device resides therefore not in the winders themselves but in the core changing or roll changing means. Only so much of the winding structure is illustrated as is necessary for an understanding of the application of the changer.

As shown the mechanism is supported upon a base or housing 61 which is carried on a support or foundation 62. The web 63 passes over a roller 64 and about a roller 65 which is driven about a fixed pivot 66. The web passes thence to a third roller 67 which is driven about a fixed pivot 68. A new core 69 is moved into position between the rollers 65 and 67 by arms 70. In the dotted line position these arms are shown depressed in the position in which they receive a new core. They are then pivoted upwardly as shown by the arrows in Figure 12 and bring the new core 69 to contact with the web 63 which is being wound upon the substantially completed roll 71 and moves the web from the dotted line position of Figure 12 to the full line position of that figure thus bringing the web into contact with the roller 65. It is to be understood that the roll 71 shown in Figures 12 and 13 is largely completed. Most of the winding of that roll has occurred when it was supported upon the rollers 65 and 67 in the position occupied by the new core 69 as shown in Figures 12 and 13. The almost completed roll 71 is only moved from the central position over the rollers 65 and 67 when it is necessary to insert a new core 69 and it is transferred to the position shown in Figures 12 and 13 where it is wholly or partially supported by the roller 78 and is rotated by that roll to complete the winding of the web upon the roll 71. The rider roller 72 is then lowered to rest on the core 69 with the web between the two. This roller is mounted in a movable support 73 which moves along one or more guides 74 and may be counterweighted. If counterweights are present they will be secured to the member 73 by a cable, chain or other means 75. Arms 76 carry the blade 77 and these arms move concentrically with the pivot of the roll 72. As shown the blade 77 is similar to the blades 29 of the earlier figures and includes means for engaging and directing the severed end of the web about the new core 69 and into the nip between that core and the roller 67. This action is illustrated in Figure 13 in which the web 63 has been severed by the knife 77 and its leading or severed edge has been engaged by the knife and its guiding or directing member and has been moved into position to be engaged by the nip between the new core 69 and the roller 67. When this is accomplished the knife is withdrawn to the position shown in Figure 14 and the rotation of the new core 69 continues and the new roll builds up. As shown in Figure 14 the new roll is partially built and rotation is continuous. The rider roller rises as the roll formation continues.

After completion the roll 71 is moved away to any suitable point of discharge and the roll 78 is then ready to receive a new roll when the latter is completed.

As shown in Figure 14 the completed roll 71 has been disposed of, the knife 77 has moved again to the inactive position, the new roll 79 is being wound up upon the new core 69 and the lever or levers 70 have moved downwardly to the position where they can engage a new core. The cycle above described for the form of Figures 12 to 14 is repeated as often as desired, and may be repeated indefinitely.

Figures 9, 10, 11:
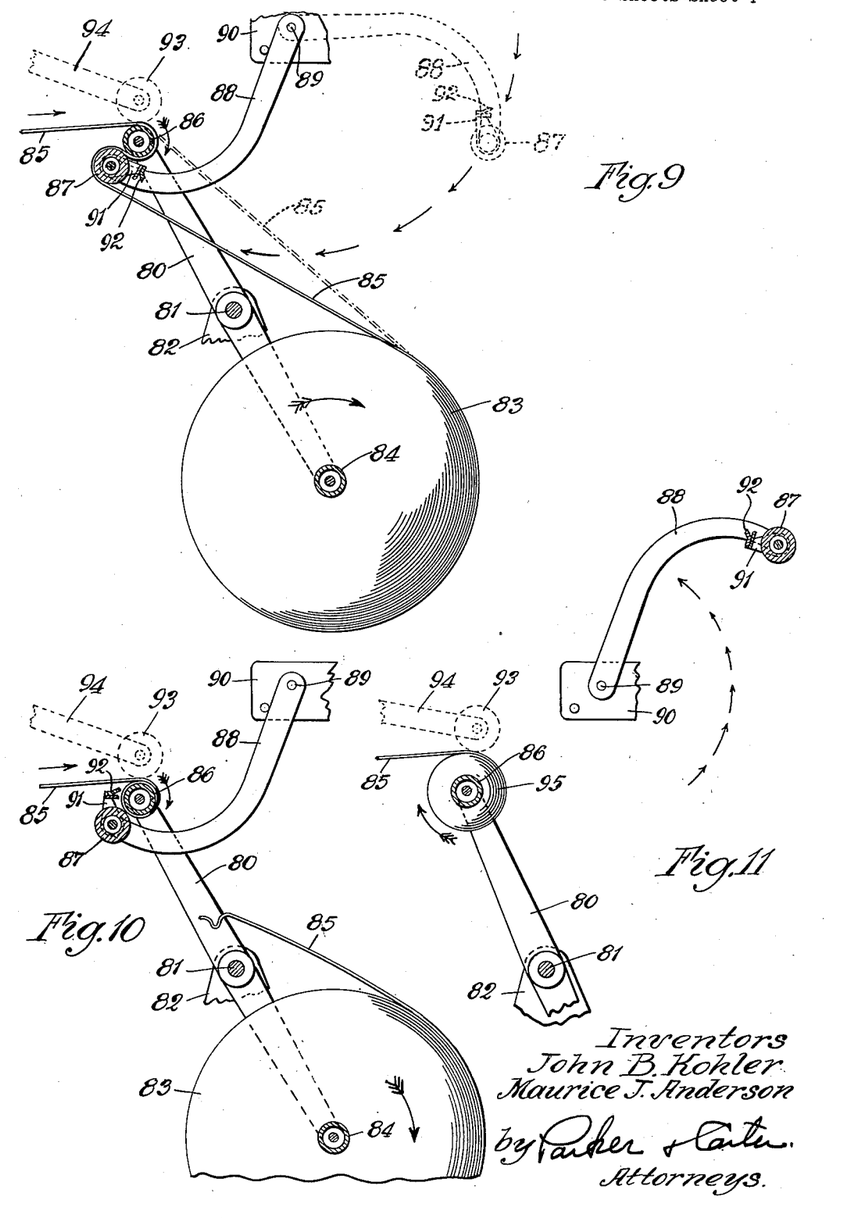
Figure 9 shows a modified form of the device at the moment when a new core is put into position with the running web.
Figure 10 illustrates the device of Figure 9 after the web has been severed and carried about the new core.
Figure 11 illustrates the form of Figures 9 and 10 after the cutting and controlling means have been moved out of engagement with the new roll.

In the modified form of Figures 9, 10, and 11 a two position rotatable winder is illustrated diagrammatically. This includes arm members 80 mounted for rotation and pivoted as at 81 upon a base 82. As shown in Figure 9 a substantially completed roll 83 has been formed upon a core 84 and is still in position upon one end of the member 80. Means are provided for driving the cores but since such means are well known in the art and to the trade they are not shown in detail here and it is sufficient for an understanding of this invention to state that the cores are driven so that the web continues to be wound upon the cores so long as they are in position.

The web 85 as shown particularly in Figures 9 and 10 has been positioned about a new core 86. The web is not yet severed in Figure 9, and the roll 83 is not completed since the web is still being wound upon it. The path of the web during the completion of the roll 83 is indicated in dotted lines in Figure 9. When the web is about to be completed a roller 87, carried between arms 88 which are themselves pivoted as at 89, upon a supporting member 90, is moved from the dotted line position of Figure 9 to the full line position of that figure. This roller in effect causes the web 85 to envelope substantially two thirds of the circumference of the new core 86. The arms 88 carry arms 91 between which a blade 92 is positioned. This blade is similar to the blades 29 and 77 of the earlier figures and includes severing and guiding or controlling means.

As shown in Figure 10 the blade has been moved from the inactive position of Figure 9 and has severed the web 85 thus completing the winding upon the roll 83. The knife has engaged the severed end of the web and has directed it to the nip formed between the web 85 and the new core 86 and thus the new roll has been commenced.

If desired, a second guiding and pressing roller 93 may be carried upon arms 94. This roller, if present, serves additionally to hold the web in contact with the new core 86 and thus insures a satisfactory start for the new roll. Such a roller is useful for grades of paper which have little tensile strength and are wound under light tension. It is unnecessary for heavy grades wound under heavy tension.

As shown in Figure 11 the new core has accumulated a substantial quantity of web upon it and a new roll 95 is in process of formation. The arms 88 have been withdrawn to the inactive position and the blade 92 has moved with them.

Many means may be used for actuating the arms 88 and for rotating the cores 84 and 86 and for rotating the reel 80 and for moving the arms 94 if they are present. The invention is not limited to particular means for moving these parts which might be actuated manually by an operator who observes the operation of the machine and moves them at suitable times.

In its various modifications, this invention consists of a method and apparatus for winding into rolls, a continuously running web of material. It relates particularly to the means and method by which the running web may be brought into contact with an empty arbor upon which a roll is to be formed, and may be caused substantially to envelope said arbor, after which the web is severed between the new arbor and the almost completed roll. Thus the envelopment of the new arbor and the winding upon the almost completed roll occur simultaneously.

The invention is applicable to many commonly used winding machines, such as shaft winders, rotatable reels, two drum winders, single drum winders, and, in fact, to any type of winding machine, which is arranged or can be arranged to accommodate a plurality of arbors, or a winding roll of web material and an empty arbor during the period of time necessary for the transfer of the winding operation from the completed roll to the empty arbor.

It is also applicable to a plurality of winding machines, whereby the web may be wound first on one, then on another of said machines.

The knife mechanism or knife operating mechanism is shown in detail in Figures 2, 15, 16 and 17. Other means for operating the knife might be used without departing from the spirit of the invention and the particular knife operating means shown are merely illustrative of one suitable knife operating means.

Figures 15, 16, 17:
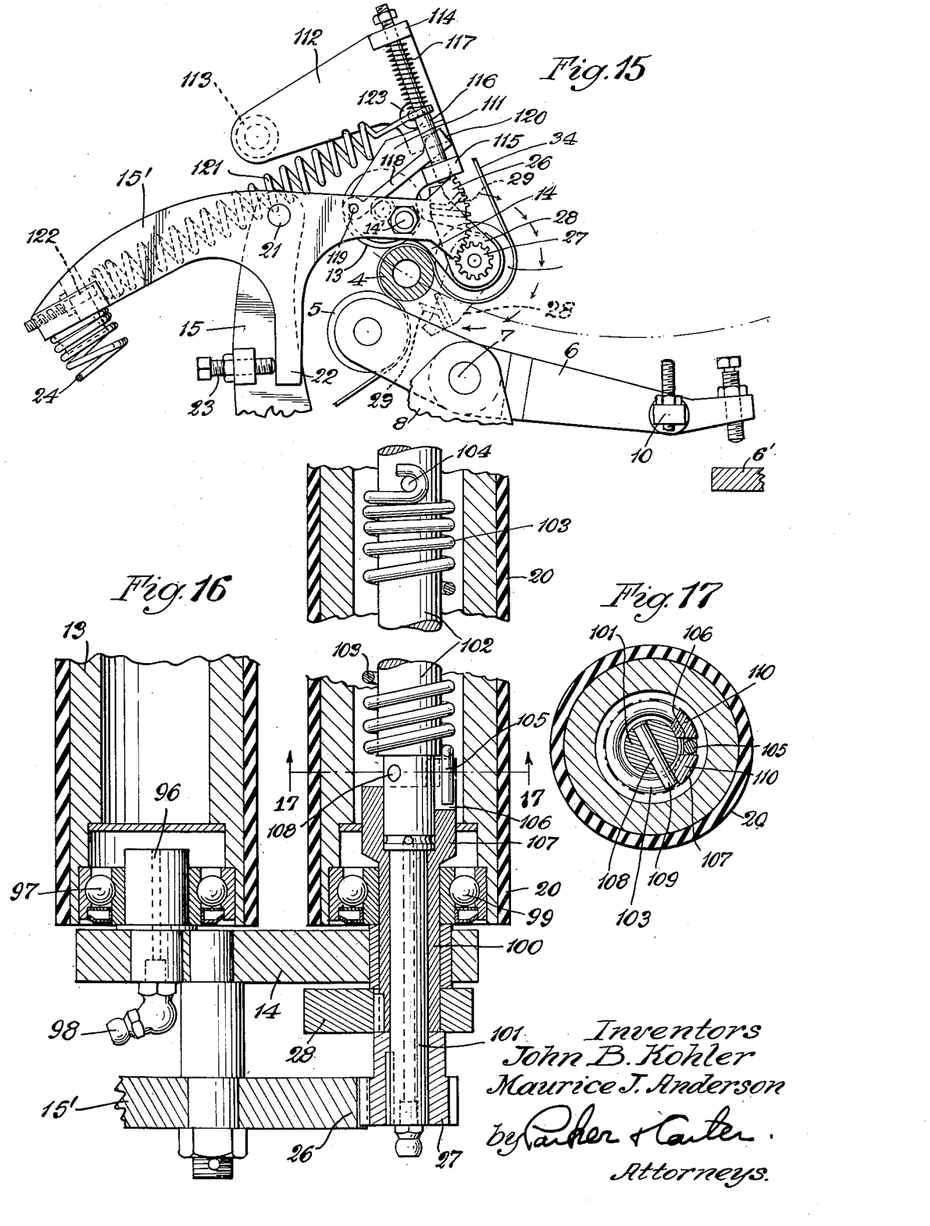
Figure 15 is a partial side elevation of the knife mechanism with parts in a different position than that shown in Figure 2.
Figure 16 is a longitudinal section taken at line 16—16 of Figure 2.
Figure 17 is a transverse detail section taken at line 17—17 of Figure 16.

As above pointed out the two rollers 13 and 20 are mounted between the arms 14. The roller 13 is supported on trunnions 96 which carry anti-friction bearings 97. Lubricating means 98 may be provided if desired.

The roller 20 is mounted on anti-friction bearings 99 the inner race of which is mounted on sleeves 100 within which is mounted a shaft 101. The blade carriers or blade arms 28 are fixed on the sleeves 100 and the pinions 27 are fixed on the shaft 101. The inner part of the shaft 101 may be enlarged as at 102 and has positioned about it a spring 103. One end of the spring is fixed or engaged upon a stop pin 104 which itself is fixed in the shaft enlargement 102. The opposite end of the spring 105 is engaged in a slot 106 formed in an enlargement 107 of the sleeve 100. Fixed in the shaft 101 is a second pin 108, one end of which protrudes as at 109 to engage one or the other of the members 110 which are preferably integral with the enlargement 107 of the sleeve 100 and between which the slot 106 is formed.

Formed integrally with one or both of the members 14 are enlargements which include the portions 111 and 112. If two such members are used a rod 113 may join the two members 112. Two bosses 114 and 115 are formed respectively on the portions 112 and 111. A latch 116 is mounted to slide in the bosses 115 and 114 and is urged in the outward direction by a spring 117. It is thus urged into the direction of the end of the knife arm 28. As shown in Fig. 2 the latch is holding the knife arm against movement. As shown in Figure 15 the latch has just cleared the end of the knife arm to free the knife for movement in the cutting direction as indicated in dotted lines in Figure 15. The latch 116 is slotted to permit an arm 118 to pass through it. This arm is pivoted as at 119 on the member 15' and may be provided with an enlarged head 120. A spring 121 is adjustably engaged at one end as at 122 to the member 15'. At the other end it is engaged in an eye 123 in the member 112. The spring 121 when free to do so moves and holds the members 14, 111 and 112 in the position of Figure 2. It assists in returning these parts to that position from the position of Figure 15.

The operation of the knife and associated parts is as follows. When the new core 4 is moved against the running web into the position shown in Figure 22, the core bears against the roller 13 and rotates the assembly including the member 14 and the parts 111 and 112 and the rollers 13 and 20 from the position of Figure 2 to the position of Figure 22. While this occurs the pinion 27 is rotated by contact with the segmental gear 26 and rotates the shaft 101 thus winding the spring 103, since the knife is at this time held by the latch 116.

As this movement continues the lever 118 finally moves the latch 116 out of engagement with the point or nose of the knife carrier 28. It will be noticed in Figure 15 that the lever 118 is held against the boss 115. When the latch 116 has been moved out of contact with the knife arm 28 the spring is then effective to rotate the sleeve 100 to which the knife arms 28 are secured and the sleeve 100 is then carried into the position shown in Figure 17 in which the pin 108 abuts against the lowermost stop 110. When this movement occurs the knife moves from the full line position of Figure 15 to the dotted line position of that figure as shown by the arrows, and this position is illustrated also in Figure 5. In this movement the knife severs the running web and engages the edge of the web and directs or moves it into the position shown in Figure 5 thereby initiating the wrapping of the web about the new core 4.

Figures 6, 7, 8:
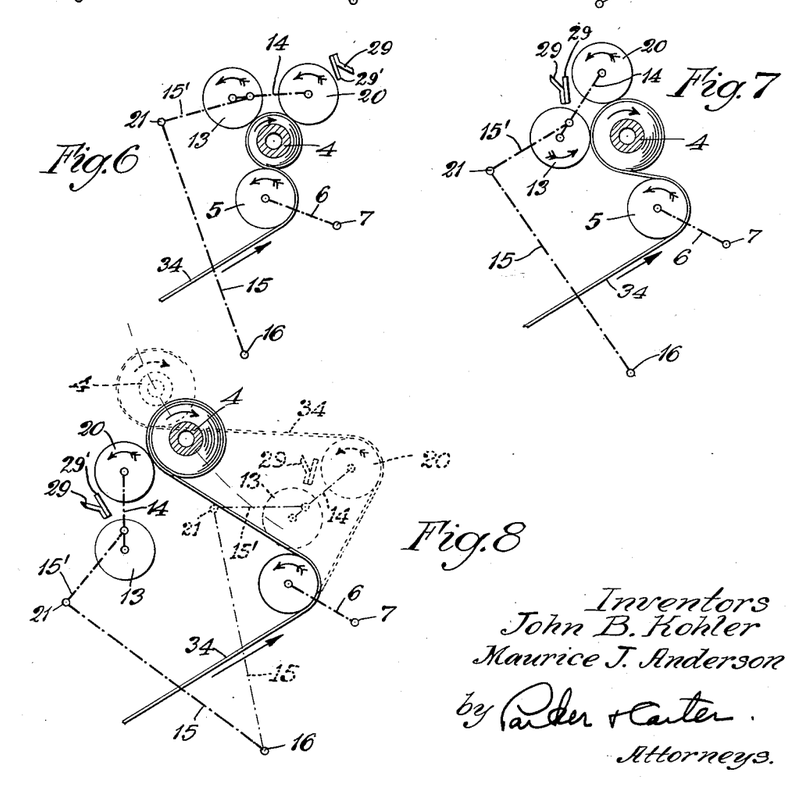
Figure 6 illustrates the parts of Figures 3, 4 and 5 after the web is in position about a new core and after some winding of the web on the core has occurred.
Figure 7 illustrates the parts after the roll which is shown in its earlier stages in Figures 3, 4, 5 and 6 has been almost completed.
Figure 8 illustrates the parts shown in Figures 3 to 7 inclusive in a further position in which the roll of web has been partially completed and the insertion of a new core will shortly commence.

As the winding proceeds on the new core this core is carried in the direction of the arrows in Figure 1 and this movement together with the building up of the web on the new core returns the members 14, 111 and 112 progressively to their initial position of Figure 2 until the rollers 13 and 20 and the knife 29 have resumed the position shown for example in Figure 7. As this movement occurs the spring 121 assists in returning the parts to their original position and the knife carriers 28 are also returned to their original position by the contact of the pinion 27 with the segmental gear 26 until it has been restored to the position of Figure 2 in which the latch 116 engages the knife carriers 28 and holds them in latched position where they remain until another new core is inserted and the cycle of operation of the knife and associated parts as described above is repeated.

The knife operating mechanism just described above is that used with the form of the invention illustrated in Figures 1 and 2. Similar knife operating means may be used with the other forms. This invention is, however, not limited to any particular form of knife driving or operating means. The knife is associated with a mechanism which causes it to move in the cutting direction at the desired time, and this means might be automatic or manually controlled.

The various forms of the mechanism and their use carry out generally the cycle of knife movement illustrated in Figures 3 to 8, inclusive. This operation is shown at a critical stage on a somewhat enlarged scale in Figure 4-A. After the knife has severed the web, it or the member 29' or an equivalent member engages the leading edge of the severed portion of the web. It is, of course, during this time that the web is still being fed through the mechanism. The knife or the member 29' or equivalent part acts as a stop or guiding means for the severed or free portion of the web as it is fed forward and may cause the creation of a bight as shown in Figure 4-A. This bight, when it occurs, is brought into contact with the web as it continues to be fed. This condition is shown in Figure 4-A and although the severed end of the web is still in contact with the moving knife, the bight or severed end has been brought into contact with the running web and is in position to be engaged by the friction of the running web and carried between it and the face of the new core 4. Thus the bight or severed end is drawn into the nip between the roller 5 and the core 4 and the envelopment of the new core by the severed portion of the web is accomplished. Therefore, when the bight occurs, it is the bight which is engaged in the nip between the new core and the adjacent roller so that the severed edge itself generally does not lead in the envelopment of the new core. This condition is also shown in Figure 13.

A bight might be formed even if the severed edge were not carried bodily backward. If the severed edge were merely stopped and the web continued to be fed, it would pile up against the stop or because of the stop and would form a bight which would come in contact with the outer surface of the running web as shown generally in Figure 4-A and would cause the bight by friction to be carried into the nip between the member 5 or comparable means and the new core.

The description set out above presupposes the formation of a bight, as illustrated particularly in Figure 4-A. Under certain conditions this bight is not necessary and does not occur, and the invention is not limited to a method or to an apparatus which inevitably produces a bight. Under some conditions the severed edge of the web 34 is guided into the nip between the new core and the roller 5 or an equivalent means directly without the formation of a bight. We have also spoken of the stopping or arresting of the severed edge. This also is not an essential feature. The member which carries the severed edge toward the nip between the in-running web 34 and the core might not contact the severed end, but merely contact a portion of the web beyond the core and guide it toward the point of nip. The details of this operation are varied somewhat by the type of web material which is being wound and by the speed of operation of the device.

In all the forms of the invention illustrated it will be seen that the web is gripped between the new core and a pressure member such as the roller 5 or equivalent means shown in the later figures before the web is severed. The result of this is that tension on the inrunning web is not broken or reduced. The powerful nip effective on the inrunning web before severance is sufficient to maintain tension on the web and thus shock, which would otherwise occur on the system ahead of the new core, is avoided by the method and apparatus illustrated, which accomplish a tight nip or grip upon the web before severance. Thus the mechanism and method disclosed herewith control the inrunning web on what might be called the upstream side before and after severance, as well as controlling the severed end on what might be called the downstream side after severance.

Although we have shown an operative form of our invention, it will be recognized that many changes in the form, shape and arrangement of parts can be made without departing from the spirit of the invention, and our showing is therefore to be taken as, in a sense, diagrammatic.

We claim:

1. In combination in a winding machine, means for winding on a plurality of arbors successively, means for directing the material being wound on one of said arbors into contact with a second arbor, means for enveloping a substantial portion of said second arbor by the running web, means for establishing a nip against said second arbor on the outrunning portion of said envelopment, said nip establishing means comprising pressure means and means for bringing said pressure means and the arbor together, and severing means including a part adapted to sever and to engage and control the free leading edge of the severed running web, to cause the web material which is being fed to form a bight which follows the second arbor to the inrunning point of contact between said web and said second arbor.

2. In combination in a winding machine, means for forming a plurality of rolls successively upon arbors, means for directing the web being wound in a partially completed roll to bring it into contact with an empty arbor for the formation of a second roll and to establish said contact about a substantial portion of the periphery of said empty arbor, means for bringing said empty arbor and said directing means together with the web nipped between them at the outrunning portion of the contact, and a severing means adapted to sever the web, said severing means being shaped and adapted to arrest the free leading edge of the severed running web, to form a bight of the web beyond the nip between said empty arbor and said directing means, and to direct said bight into contact with the running web ahead of said empty arbor, whereby the said bight is drawn into contact with said empty arbor by the movement of said web toward said empty arbor, and the formation of a roll on said empty arbor is begun without interruption in the rate of movement of the moving web.

3. In combination in a winding machine, means for winding successively a plurality of rolls of material, each on an arbor, means for directing the web being wound on a substantially completed roll to bring it into contact with an empty arbor, said directing means including a plurality of guiding members pressing said web against said empty arbor at separated points, and severing means adapted to sever the web between the substantially completed roll and the empty arbor, means to move the severing means across the path of movement of the web to sever the web, said severing means including an abutment surface positioned to engage and to arrest the free leading edge of the severed running web to thereby cause the web to buckle and form a loop transversely of the web near the severed end thereof, said severing means being movable in a path to guide said loop portion of the running web between said empty arbor and one of said guiding members at the inrunning part of the web, and into contact with the running web as it moves to the nip between said directing member and said empty arbor, whereby the looped portion of the web is drawn in, in part by the running web as it moves toward said nip, and whereby the formation of a new roll is initiated on the empty arbor without interruption in the rate of movement of the material running toward said empty arbor.

4. In combination in a winding machine, means for winding successively a plurality of rolls of material, each on an arbor, means for directing the web being wound on a substantially completed roll to bring it into contact with an empty arbor, and for establishing said contact about a substantial part of the periphery of said second arbor, said directing means including a guiding member yieldingly held against said empty arbor, and severing means together with means to move the severing means across the path of movement of the web to sever the web between the substantially completed roll and the empty arbor, said severing means being shaped to abut the free leading edge of the severed running web and arrest its forward progress to thereby form a loop in the web rearwardly of said leading edge, said severing means being movable in a path to direct said loop into contact with an inrunning portion of the web as it moves to the nip between said guiding member and said empty arbor, whereby the severed end is drawn in, in part by the running web as it moves toward said nip, and whereby the formation of a new roll is initiated on the empty arbor without interruption in the rate of movement or supply of the material running toward said empty arbor.

5. The method of winding a series of rolls from a continuously supplied web, which comprises the following steps: winding a roll to approximately the desired size, establishing contact between the web running to said roll and an empty mandrel, causing the running web substantially to envelop said mandrel, pressing said running web tightly against said mandrel on the outrunning portion of said envelopment, severing said web between said mandrel and the previously formed roll, engaging the severed end of the running web as it continues to move from the source of supply, and causing the formation of a bight adjacent the severed end of the web as it moves from the nip between said mandrel and the point of pressure against said mandrel, and causing the bight to engage the mandrel and the inrunning web as the latter moves toward the mandrel from the source of supply, and thereby causing the bight to be drawn completely about the mandrel, and thus commencing the formation of a new roll.

6. The method of winding a series of rolls from a continuously supplied web, which comprises the following steps: winding a roll to approximately the desired size, establishing contact between the web running to said roll and an empty mandrel, causing the running web substantially to envelop said mandrel, pressing said running web tightly against said mandrel on the outrunning portion of said envelopment, severing said web between said mandrel and the previously formed roll, engaging the severed end of the running web as it continues to move from the source of supply, and causing the formation of a bight adjacent the severed end of the web as it moves from the nip between said mandrel and the point of pressure against said mandrel, and causing the bight to engage the mandrel and the inrunning web as the latter moves toward the mandrel from the source of supply, and thereby causing the bight to be drawn completely about the mandrel, and thus commencing the formation of a new roll, and repeating the said cycle of operation until the desired number of rolls has been completed.

7. The method of winding a series of rolls from a continuously supplied web, which comprises the following steps: winding a roll to approximately the desired size, establishing contact between the web running to said roll and an empty mandrel, causing the running web to envelop a substantial portion of the periphery of said mandrel, pressing said running web tightly against said mandrel on both the outrunning and inrunning portions of said envelopment, severing said web between said mandrel and the previously formed roll, engaging the severed end of the running web as it continues to move from the source of supply, and causing the formation of a bight adjacent the severed end of the web as it moves from the nip between said mandrel and the point of pressure against said mandrel, and causing the bight to engage the mandrel and the inrunning web as the latter moves toward the mandrel from the source of supply, and thereby causing the bight to be drawn completely about the mandrel, and thus commencing the formation of a new roll.

8. The method of winding a series of rolls from a continuously supplied web, which comprises the following steps: winding a roll to approximately the desired size, establishing contact between the web running to said roll and an empty mandrel, causing the running web substantially to envelop said mandrel, pressing said running web tightly against said mandrel on the outrunning portion of said envelopment, severing said web between said mandrel and the previously formed roll, engaging the severed end of the running web as it continues to move from the source of supply and arresting and controlling said severed end, and causing the formation of a bight adjacent the severed end of the web as it moves from the nip between said mandrel and the point of pressure against said mandrel, and moving the bight by the severing means to engage the mandrel and the inrunning web as the latter moves toward the mandrel from the source of supply, and thereby causing the bight to be drawn completely about the mandrel, and thus commencing the formation of a new roll.

9. The method of winding a series of rolls from a continuously supplied web, which comprises the following steps: winding a roll to approximately the desired size, establishing contact between the web running to said roll and an empty mandrel, causing the running web to envelop a substantial portion of the periphery of said mandrel, pressing said running web tightly against said mandrel on both the outrunning and the inrunning portions of said envelopment, severing said web between said mandrel and the previously formed roll, engaging the severed end of the running web as it continues to move from the source of supply and arresting and controlling said severed end, and causing the formation of a bight adjacent the severed end of the web as it moves from the nip between said mandrel and the point of pressure against said mandrel, and moving the bight by the severing means to engage the mandrel and the inrunning web as the latter moves toward the mandrel from the source of supply, and thereby causing the bight to be drawn completely about the mandrel, and thus commencing the formation of a new roll.

10. The method of winding a series of rolls from a continuously supplied web, which comprises the following steps: winding a roll to approximately the desired size, establishing contact between the web running to said roll and an empty mandrel, causing the running web substantially to envelop said mandrel, pressing said running web tightly against said mandrel on the outrunning portion of said envelopment, severing said web between said mandrel and the previously formed roll, controlling the severed end of the running web as it continues to move from the source of supply, and causing it to engage the mandrel and the inrunning web as the latter moves toward the mandrel from the source of supply, and thereby causing the severed end to be drawn completely about the mandrel, and thus commencing the formation of a new roll.

11. In combination in a winding machine, means for winding a web on a plurality of arbors successively, means for continuously supplying web material to be wound, means for directing the web material being wound on one of said arbors into contact with a second arbor, severing means for severing said web material, and means for maintaining tension on that part of the material which is about the arbor as it is fed after severing has occurred, said severing means including a portion positioned to abuttingly engage and to arrest the free leading edge of the severed running web as it is being supplied, to cause the web material which is being fed to buckle transversely and form a loop in said web rearwardly of said leading edge which loop engages the advancing web rearwardly of the loop and follows the same to the inrunning point of contact between said web and said second arbor.

12. The method of winding a series of rolls from a continuously supplied web, which comprises the following steps: winding a roll to approximately the desired size, establishing contact between the web running to said roll and an empty mandrel, causing the running web substantially to envelop said mandrel, pressing said running web tightly against said mandrel, severing said web between said mandrel and the previously formed roll, maintaining the tension about the mandrel on the continuously supplied web after the severance, abuttingly engaging the free leading edge of the advancing severed end of the running web to arrest the same and form a loop in the web adjacent the severed end of the web as it moves from the nip between said mandrel and the point of pressure against said mandrel, and moving the loop into engagement with the mandrel and the inrunning web as the latter moves toward the mandrel from the source of supply, and thereby causing the loop to be drawn completely about the mandrel, and thus commencing the formation of a new roll.

13. In combination in a winding means, means for winding a plurality of rolls successively from a web, means for supporting a plurality of arbors on which said rolls are wound successively, means for forming a nip against an arbor to facilitate the commencement of a new roll, said means comprising a pressure roller and means for moving said pressure roller and the new arbor together to establish said nip upon the web at a point not less than 180° about said arbor from the point of its first contact with the running web, whereby the web about the arbor is retained under tension, and means for severing the web beyond said nip, said severing means being effective to carry the severed end of the web in the direction of the inrunning point of contact between the web and said arbor.

14. In combination in a winding machine, means for winding a plurality of rolls successively from a running web, a plurality of arbors on which said rolls are wound, means for enveloping a substantial portion of an arbor by the running web including a plurality of rollers movably mounted opposite one face of the web, means movably mounting an arbor opposite the other face of the web, means for relatively moving the rollers and arbor towards each other until the rollers and arbor engage opposite faces of the web and the web is wrapped around a substantial part of the arbor, one of said rollers establishing a nip on the web against the arbor on the outrunning portion of said envelopment and another of said rollers establishing a nip on the web against the arbor on the inrunning portion of the envelopment, a severing means and means for moving said severing means to sever the web beyond said first-mentioned nip and engage the advancing severed end of the web to arrest forward movement thereof and thereby deflect a portion of the web rearwardly of said severed end into the second-mentioned nip at the point of inrunning contact between the web and the arbor.

15. In combination in a winding machine, means for winding a plurality of rolls successively from a web, means for enveloping a substantial portion of an arbor by the running web, means for establishing a nip against the arbor on the outrunning portion of said envelopment, said nip establishing means comprising a pressure means and means for bringing said pressure means and the arbor together, and a severing means and means for moving said severing means to sever the web beyond said nip, said severing means having a line of movement toward the inrunning point of contact of the web with the arbor.

16. In combination with a winding machine, means for winding a plurality of rolls successively from a web, means for enveloping a substantial portion of an arbor by the running web, means for establishing a nip against the arbor on the outrunning portion of said envelopment, said nip establishing means comprising a pressure means and means for bringing said pressure means and the arbor together, and a severing means and means for moving said severing means to sever the web beyond said nip, said severing means including a part adapted to engage the severed end of the web and having a line of movement toward the inrunning point of contact of the web with the arbor.

17. The method of winding successively from a running web upon a plurality of cores successively presented to the web, which includes the following steps; causing relative movement between the running web and a new core and enveloping a substantial part of said core by said web, causing nips against said core upon the outrunning and inrunning portions of said envelopment, thereafter severing the web beyond said nips and carrying the severed end of the web in the direction of the inrunning point of contact between the web and said core, and maintaining tension of the web about the core before, during and after severance of the web.

18. In combination in a winding device, a plurality of means for guiding a moving web of material to be wound, means for supporting a roll of such web during winding, said guiding means adapted in cooperation with a core to guide said web about a substantial portion of the circumfeernce of said core, one of said guiding means being positioned to nip the web against the core under pressure at the inrunning end of the contact of the web with the core, another of said guiding means being positioned to nip the web under pressure against the core adjacent the outrunning end of the contact of the web with the core, and movable directing and severing means adapted to sever the moving web between said guiding means and said winding roll and to direct the severed, leading edge of the moving, unwound portion of the web into the nip between said core and said firstnamed guiding means.

19. In combination in a winding device, a plurality of means for guiding a moving web of material to be wound, means for supporting a roll of such web during winding, said guiding means adapted in cooperation with a core to guide said web about a substantial portion of the circumference of said core, one of said guiding means being positioned to nip the web against the core under pressure at the inrunning end of the contact of the web with the core, another of said guiding means being positioned to nip the web under pressure against the core adjacent the outrunning end of the contact of the web with the core, and movable directing and severing means adapted to sever the moving web between said guiding means and said winding roll and provided with a portion adapted to direct the severed, leading edge of the moving, unwound portion of the web into the nip between said core and said firstnamed guiding means.

20. In combination in a winding machine, means for winding on a plurality of arbors successively from a web of material continuously supplied, means for directing the material being wound on one of said arbors into contact with a second arbor and for establishing said contact about a substantial part of the periphery of said second arbor, said directing means being positioned to nip the web against the arbor on the outrunning portion of the web, severing means, and means for maintaining tension on the continuously supplied material after severance, said severing means adapted to sever the web between said second arbor and a previous arbor, said severing means also adapted to contact and to arrest the free leading edge of the severed running web and to cause the web material which is being fed from the nip between said directing means and the said second arbor to form a bight which follows said second arbor to the inrunning point of contact between said web and said second arbor.

JOHN B. KOHLER.
MAURICE J. ANDERSON.

REFERENCES CITED

The following references are of record in the file of this patent:

UNITED STATES PATENTS

| Number | Name | Date |
| --- | --- | --- |
| 1,248,542 | Pope | Dec. 4, 1917 |
| 2,261,417 | Schultz et al. | Nov. 4, 1941 |
| 2,332,371 | Corbin et al. | Oct. 19, 1943 |
| 2,357,976 | Roesen | Sept. 12, 1944 |
| 2,361,264 | Christman | Oct. 24, 1944 |
| 2,361,265 | Christman | Oct. 24, 1944 |